(12) United States Patent
Bell

(10) Patent No.: US 11,971,509 B1
(45) Date of Patent: Apr. 30, 2024

(54) METHODS, SYSTEMS, AND DEVICES FOR CORRECTING OUT-OF-BAND INTERFERENCE FOR SENSORS MONITORING CUMULATIVE EXPOSURE TO RADIATION

(71) Applicant: Actev Motors, Inc., Mooresville, NC (US)

(72) Inventor: David Bundy Bell, Mooresville, NC (US)

(73) Assignee: Actev Motors, Inc., Mooresville, NC (US)

( * ) Notice: Subject to any disclaimer, the term of this patent is extended or adjusted under 35 U.S.C. 154(b) by 291 days.

(21) Appl. No.: 17/580,006

(22) Filed: Jan. 20, 2022

Related U.S. Application Data

(60) Provisional application No. 63/206,049, filed on Jan. 25, 2021.

(51) Int. Cl.
*G01T 1/02* (2006.01)
*G01J 1/42* (2006.01)
*G01J 1/44* (2006.01)

(52) U.S. Cl.
CPC ............... *G01T 1/02* (2013.01); *G01J 1/429* (2013.01); *G01J 1/44* (2013.01)

(58) Field of Classification Search
CPC ............... G01T 1/02; G01J 1/429; G01J 1/44
See application file for complete search history.

(56) References Cited

U.S. PATENT DOCUMENTS

| | | | |
|---|---|---|---|
| 9,636,522 B2 * | 5/2017 | Oversluizen | A61N 5/0616 |
| 11,681,053 B1 * | 6/2023 | Bell | G01T 1/2018 |
| | | | 250/370.14 |
| 2020/0330011 A1 * | 10/2020 | Honore | A61B 5/1455 |

* cited by examiner

*Primary Examiner* — David P Porta
*Assistant Examiner* — Gisselle M Gutierrez
(74) *Attorney, Agent, or Firm* — NK Patent Law

(57) ABSTRACT

Disclosed herein are methods, systems, and devices for correcting out-of-band interference for sensors monitoring cumulative exposure to radiation. In one embodiment, a device includes a processor and a memory electrically coupled with the processor. The device further includes first optical-to-electrical conversion circuitry electrically coupled with the processor and configured to detect radiation associated with a first wavelength, and second optical-to-electrical conversion circuitry electrically coupled with the processor and configured to detect radiation associated with a second wavelength. For example, the first wavelength may be associated with a first wavelength of a first wavelength detection range associated with the first optical-to-electrical conversion circuitry and the second wavelength may be associated with a second wavelength of a second wavelength detection range associated with the second optical-to-electrical conversion circuitry.

23 Claims, 4 Drawing Sheets

FLOW CHART
200

- 202: DETERMINE AN OPTICAL RADIATION DOSE ASSOCIATED WITH A FIRST WAVELENGTH USING FIRST OPTICAL-TO-ELECTRICAL CONVERSION CIRCUITRY
- 204: DETERMINE OPTICAL POWER ASSOCIATED WITH A SECOND WAVELENGTH USING SECOND OPTICAL-TO-ELECTRICAL CONVERSION CIRCUITRY
- 206: APPLY A CORRECTION FACTOR TO THE OPTICAL RADIATION DOSE ASSOCIATED WITH THE FIRST WAVELENGTH BASED ON THE OPTICAL POWER ASSOCIATED WITH THE SECOND WAVELENGTH
- 208: PROVIDE A FIRST NOTIFICATION UPON DETERMINING THE OPTICAL RADIATION DOSE ASSOCIATED WITH THE FIRST WAVELENGTH IS GREATER THAN A FIRST PREDETERMINED THRESHOLD
- 210: PROVIDE A SECOND NOTIFICATION UPON DETERMINING THE OPTICAL RADIATION DOSE ASSOCIATED WITH THE FIRST WAVELENGTH IS GREATER THAN A SECOND PREDETERMINED THRESHOLD

METHODS, SYSTEMS, AND DEVICES FOR CORRECTING OUT-OF-BAND INTERFERENCE FOR SENSORS MONITORING CUMULATIVE EXPOSURE TO RADIATION

PRIORITY CLAIM

This application claims priority to U.S. Provisional Patent Application Ser. No. 63/206,049 filed Jan. 25, 2021, entitled "UVC ULTRAVIOLET LIGHT DOSIMETER WITH SUNLIGHT REJECTION." The disclosure of the aforementioned application is incorporated herein by reference in its entirety.

TECHNICAL FIELD

The presently disclosed subject matter relates generally to sensor devices for environmental monitoring. More specifically; methods, systems, and devices are disclosed herein for correcting out-of-band interference for sensors monitoring cumulative exposure to radiation.

BACKGROUND

Ultraviolet-C(UVC) disinfection systems have become popular in hospitals for the reduction of health care associated infections (HAIs). Millions of patients and staff are affected by HAIs each year. These UVC ultraviolet disinfection systems broadcast high-intensity UVC light to permanently damage the ribonucleic acid (RNA) and deoxyribonucleic acid (DNA) in pathogens and thereby neutralize their ability to reproduce.

The SARS-CoV-2 (COVID-19) pandemic has increased the awareness that pathogens (e.g., bacteria, viruses, and fungi) can easily transfer between people by surface contact and aerosols. Consequently, the usage of UVC ultraviolet disinfection systems in hospitals has rapidly increased, and such UVC ultraviolet disinfection systems are now being deployed in various public locations to mitigate the transfer of pathogens.

Most UVC disinfection systems use high-power low-pressure mercury vapor lamps to produce 254 nanometer (nm) wavelength UVC ultraviolet light. Different types of pathogens require different dose levels for sufficient disinfection. However, at least 99.99% of most pathogens can be neutralized with a 254 nm UVC dose of 50 millijoules per square centimeter ($mJ/cm^2$). Consequently, a 50 $mJ/cm^2$ dose is often used as the minimum target dose for disinfection. Additionally, medical tools and protective gear are often irradiated with much higher UVC doses (e.g., exceeding 1,000 $mJ/cm^2$).

With high-power UVC disinfection becoming widespread, the risk of inadvertent human exposure is increasing. The International Organization for Standardization (ISO) recommends a maximum daily limit of human 254 nm UVC exposure of 6 $mJ/cm^2$. This limit is a small fraction of the doses being regularly delivered to various surfaces and objects for disinfection.

Human exposure to UVC poses health risks. Fortunately, UVC light does not penetrate through the skin's epidermis due to the protective layer of dead skin cells. Nevertheless, exposure to high doses of UVC light can still produce an itchy feeling with excessive dry flaking skin. Unlike skin, eyes do not have a protective layer, so UVC light can cause significant irritation, and in extreme cases, cataracts.

Because of the aforementioned health risks, monitoring human exposure to UVC light is likely to become more common and perhaps mandated for workers in locations where UVC light is used. Today, X-Ray dosimeter badges are commonly worn by healthcare workers. Personal UVC dosimeters will likely also become commonplace as UVC disinfection becomes prevalent.

As such, new and improved methods, devices, and systems are needed for monitoring human exposure to UVC radiation when UVC disinfection systems are in use.

SUMMARY

Disclosed herein are methods, systems, and devices for correcting out-of-band interference for sensors monitoring cumulative exposure to radiation. In one embodiment, a device includes a processor and a memory electrically coupled with the processor. The device further includes first optical-to-electrical conversion circuitry electrically coupled with the processor and configured to detect radiation associated with a first wavelength, and second optical-to-electrical conversion circuitry electrically coupled with the processor and configured to detect radiation associated with a second wavelength. For example, the first wavelength may be associated with a first wavelength of a first wavelength detection range associated with the first optical-to-electrical conversion circuitry and the second wavelength may be associated with a second wavelength of a second wavelength detection range associated with the second optical-to-electrical conversion circuitry.

In some embodiments, the processor may be configured for determining an optical radiation dose associated with the first wavelength and determining optical power (i.e., intensity) associated with the second wavelength. The processor may be further configured for applying a correction factor to the optical radiation dose associated with the first wavelength. The correction factor may be determined based on the optical power associated with the second wavelength. The optical radiation dose is understood to be optical energy per unit area. For example, optical radiation dose may be determined in millijoules per square centimeter ($mJ/cm^2$).

In some embodiments, the correction factor may be further determined based on first measured radiation detected by the first optical-to-electrical conversion circuitry and second measured radiation detected by the second optical-to-electrical conversion circuitry during a calibration procedure. The first measured radiation and the second measured radiation may be individually or simultaneously received from a calibration source providing a calibration radiation power level at the second wavelength during the calibration procedure.

In some embodiments, the processor may be further configured for determining the correction factor based on a first approximate linear relationship between first measured radiation and the calibration radiation power level and a second approximate linear relationship between second measured radiation and the calibration radiation power level. (I.E., The first optical-to-electrical conversion circuitry has an approximate linear response to received optical power from the calibration source and the second optical-to-electrical conversion circuitry has an approximate linear response to received optical power from the calibration source.)

In some embodiments, the processor may be further configured for determining the correction factor based on a lookup table.

In some embodiments, the calibration source may be configured to provide visible light (e.g., white light).

In some embodiments, the processor may be further configured for providing a first notification upon determining the optical radiation dose associated with the first wavelength is greater than a first predetermined threshold.

In some embodiments, the first predetermined threshold may be associated with a first human exposure limit associated with the first wavelength and the first human exposure limit may be associated with a first human exposure duration.

In some embodiments, the processor may be further configured for providing a second notification upon determining upon the optical radiation dose associated with the first wavelength is greater than a second predetermined threshold. The second predetermined threshold may be associated with a second human exposure limit associated with the first wavelength and the second human exposure limit may be associated with a second human exposure duration.

In some embodiments, the first notification may be associated with an early warning alert and the second notification may be associated with an imminent danger alert.

In some embodiments, the first notification may be a visual notification, an audible notification, and/or the like.

In some embodiments, the visual notification may include a light emitting diode (LED), a liquid crystal display (LCD), a touchpad display, and/or the like.

In some embodiments, the first notification may be a wireless notification. In further embodiments, the wireless notification may be provided over a wireless personal area network (WPAN), a wireless local area network (WLAN), a cellular network, a Zigbee® network, a Zwave® network, a LoRaWAN® network, and/or the like. In certain embodiments, the WPAN may be a Bluetooth® Low Energy (BLE) network.

In some embodiments, the first notification may include a value associated with the optical radiation dose of the first wavelength.

In some embodiments, the first wavelength may be between 200 nanometers and 280 nanometers and the second wavelength may be between 400 nanometers and 750 nanometers.

In some embodiments, the correction factor may be indicative of out-of-band radiation received by the first optical-to-electrical conversion circuitry. In further embodiments, the out-of-band radiation may be associated with exposure to visible light (e.g., sunlight, ambient lighting, etc.) of the first optical-to-electrical conversion circuitry.

In some embodiments, the device may be a wearable personal dosimeter.

In another embodiment, a processor implemented method includes determining an optical radiation dose associated with a first wavelength, determining optical power associated with a second wavelength, applying a correction factor to the optical radiation dose associated with the first wavelength. The processor implemented method further includes providing a first notification upon determining the optical radiation dose associated with the first wavelength is greater than a first predetermined threshold. The correction factor is determined based on the optical power associated with the second wavelength. First optical-to-electrical conversion circuitry is used in determining the optical radiation dose associated with the first wavelength, and second optical-to-electrical conversion circuitry is used in determining the optical power associated with the second wavelength.

In another embodiment, a non-transitory computer-readable storage medium is disclosed. The non-transitory computer-readable storage medium stores instructions to be implemented by a processor. The instructions when executed by the processor provide a method including determining an optical radiation dose associated with a first wavelength, determining optical power associated with a second wavelength, applying a correction factor to the optical radiation dose associated with the first wavelength. The method further includes providing a first notification upon determining the optical radiation dose associated with the first wavelength is greater than a first predetermined threshold. The correction factor is determined based on the optical power associated with the second wavelength. First optical-to-electrical conversion circuitry is electrically coupled with the processor and used in determining the optical radiation dose associated with the first wavelength. Second optical-to-electrical conversion circuitry is electrically coupled with the processor and used in determining the optical power associated with the second wavelength.

In another embodiment, a device includes a processor and a memory electrically coupled with the processor. The device further includes first optical-to-electrical conversion circuitry electrically coupled with the processor and configured to detect radiation associated with a first wavelength, and second optical-to-electrical conversion circuitry electrically coupled with the processor and configured to detect radiation associated with a second wavelength. The processor is configured for determining an optical radiation dose associated with the first wavelength and determining optical power associated with the second wavelength. The processor is further configured for suspending accumulating the optical radiation dose associated with the first wavelength upon determining the optical power associated with the second wavelength is greater than a first predetermined threshold.

In some embodiments, the processor may be further configured for resuming accumulating the optical radiation dose associated with the first wavelength upon determining the optical power associated with the second wavelength is less than a second predetermined threshold.

In some embodiments, the second predetermined threshold may be less than the first predetermined threshold. In other embodiments, the second predetermined threshold may be substantiality equal to the first predetermined threshold.

In some embodiments, the processor may be further configured for providing a first notification upon determining the optical radiation dose associated with the first wavelength is greater than a third predetermined threshold.

In some embodiments, the first predetermined threshold may be associated with a first human exposure limit and the first human exposure limit may be associated with a first human exposure duration.

In some embodiments, the processor may be further configured for providing a second notification upon determining the optical radiation dose associated with the first wavelength is greater than a fourth predetermined threshold. The fourth predetermined threshold may be associated with a second human exposure limit and the second human exposure limit may be associated with a second human exposure duration.

In some embodiments, the first notification may be associated with an early warning alert and the second notification may be associated with an imminent danger alert.

In some embodiments, the first notification may be a visual notification and/or an audible notification. In further embodiments, the visual notification may include a light emitting diode (LED), a liquid crystal display (LCD), and/or the like.

In some embodiments, the first notification may be a wireless notification. In further embodiments, the wireless notification may be provided by a wireless personal area network (WPAN), a wireless local area network (WLAN), a cellular network, and/or the like. In certain embodiments, the wireless notification is provided over at least one of a Bluetooth® Low Energy (BLE) network, a Zigbee® network, a Zwave® network, a LoRaWAN® network, and/or the like.

In some embodiments, the first notification may include a value associated with the optical radiation dose of the first wavelength.

In some embodiments, the first wavelength may be between 200 nanometers and 280 nanometers and the second wavelength may be between 400 nanometers and 750 nanometers. In further embodiments, the first predetermined threshold may be associated with exposure to sunlight of the first optical-to-electrical conversion circuitry.

In some embodiments, the device may be a wearable personal dosimeter.

In another embodiment, a processor implemented method includes determining an optical radiation dose associated with a first wavelength and determining optical power associated with a second wavelength. The processor implemented method further includes suspending determining the optical radiation dose associated with the first wavelength upon determining the optical power associated with the second wavelength is greater than a first predetermined threshold. The processor implemented method further includes resuming determining the optical radiation dose associated with the first wavelength upon determining the optical power associated with the second wavelength is less than a second predetermined threshold. The processor implemented method also includes providing a first notification upon determining the optical radiation dose associated with the first wavelength is greater than a third predetermined threshold. First optical-to-electrical conversion circuitry is used in determining the optical radiation dose associated with the first wavelength, and second optical-to-electrical conversion circuitry is used in determining the optical power associated with the second wavelength.

In another embodiment, a non-transitory computer-readable storage medium is disclosed. The non-transitory computer-readable storage medium stores instructions to be implemented by a processor. The instructions when executed by the processor provide a method including determining an optical radiation dose associated with a first wavelength, and determining optical power associated with a second wavelength. The method further includes suspending determining the optical radiation dose associated with the first wavelength upon determining the optical power associated with the second wavelength is greater than a first predetermined threshold. The method further includes resuming determining the optical radiation dose associated with the first wavelength upon determining the optical power associated with the second wavelength is less than a second predetermined threshold. The method also includes providing a first notification upon determining the optical radiation dose associated with the first wavelength is greater than a third predetermined threshold. First optical-to-electrical conversion circuitry is electrically coupled with the processor and used in determining the optical radiation dose associated with the first wavelength. Second optical-to-electrical conversion circuitry is electrically coupled with the processor and used in determining the optical power associated with the second wavelength.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

Figure 1:
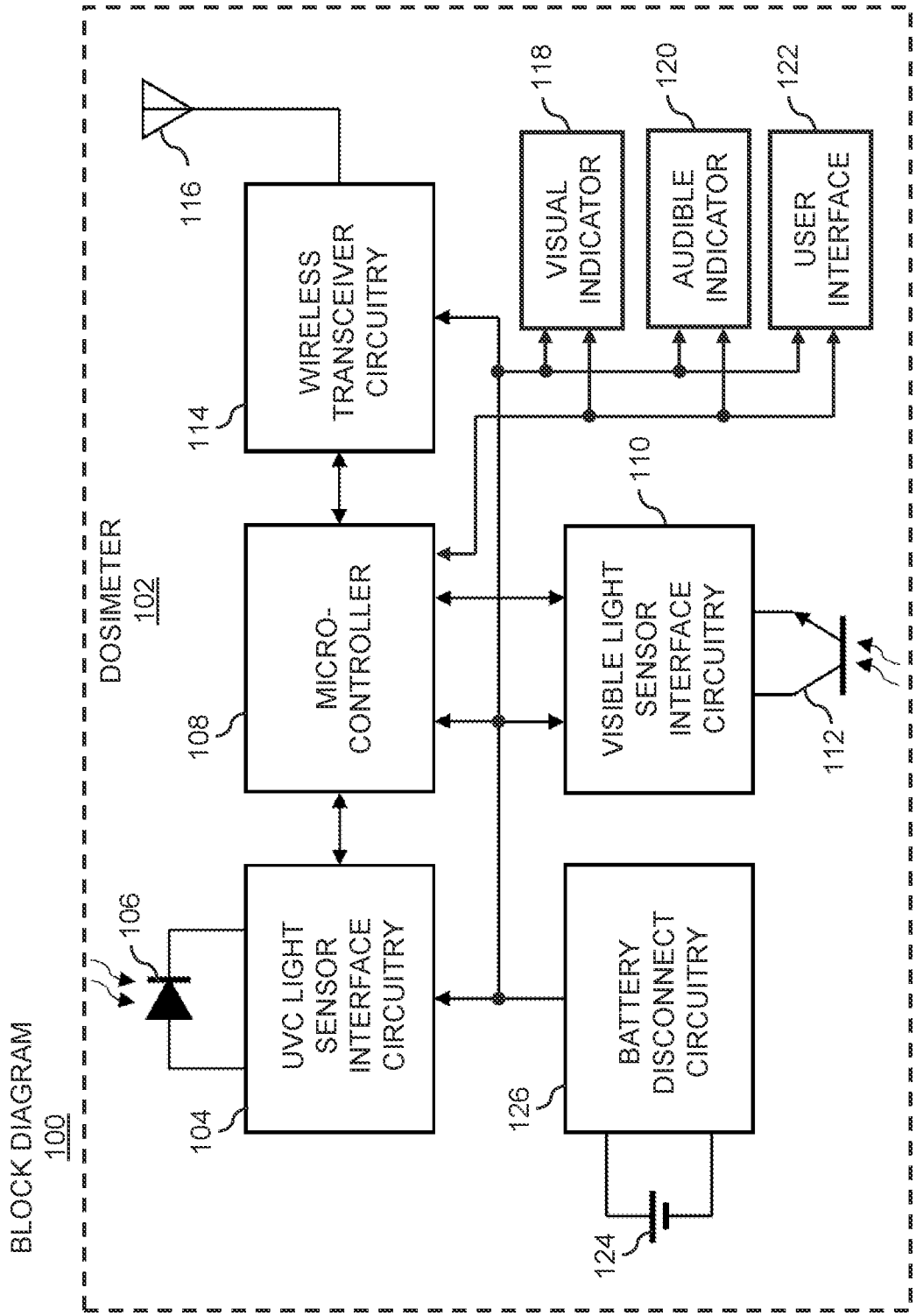
FIG. 1 depicts a block diagram illustrating a dosimeter having sunlight rejection in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Disclosed herein are methods, systems, and devices for correcting out-of-band interference for sensors monitoring cumulative exposure to radiation. (e.g., rejecting sunlight and higher intensity ambient light). This includes measuring and accumulating UVC light energy per unit area (i.e., a dose). The methods, systems and devices apply to personal dosimeters including prevention of erroneous dose readings due to visible light (e.g., sunlight, ambient lighting, etc.) exposure.

Personal UVC dosimeter badges will likely be clipped to clothing and worn for the entire workday by personnel (e.g., healthcare employees) working in facilities that use UVC to disinfect the air or surfaces. This may include periods where workers are outside walking between buildings, going to lunch or walking to and from their cars. Because personal UVC dosimeters must be very sensitive. This produces a dynamic range challenge for the dosimeter when exposed to very high levels of visible light. Additionally, even exposure to certain levels of internal ambient lighting can produce unacceptable error in UVC dosimeters.

A personal UVC dosimeter must be able to accurately integrate at a low level of 6 millijoules per square centimeter ($mJ/cm^2$) over an eight hour workday (or possibly a twelve to twenty-four hour shift for some healthcare providers). This requires UVC power in the range of 100 nanowatts per square centimeter ($nW/cm^2$) be measured in order to integrate to accurately integrate dose over this period of time. However, direct sunlight has an intensity of approximately 100 $mW/cm^2$.

Sunlight contains extremely low levels of UVC because UVC is blocked by the Earth's ionosphere. However, the fact that sunlight is 1,000,000 times more powerful than the UVC sensitivity of the dosimeter, sunlight is problematic for accurate measurement.

A practical UVC dosimeter must be capable of blocking out-of-band light power with at least 120 decibels (dB) or a 1,000,000:1 rejection. Today's best UVC sensors are not capable of this level of sunlight immunity. The highest performance laboratory UVC power meters available today may register 300 $uW/cm^2$ (or more) when exposed to direct sunlight even though nearly zero UVC power is actually present. This level of sunlight sensitivity means that a personal UVC dosimeter may falsely detect a dangerous UVC dose level after less than a minute of sunlight exposure. As previously disclosed, even normal ambient lighting levels (e.g., 2000 Lux) may produce significant errors with UVC dose measurement.

As such, a personal UVC dosimeter that contains a visible light sensor to detect high-intensity ambient light, allowing the dosimeter to correct and/or suspend integration of UVC power when sunlight is detected is needed. Such a dosimeter would not result in compromised protection because outdoor environments do not contain sources of significant UVC radiation. The personal UVC dosimeter should be configured to be attached to clothing for the purpose of monitoring UVC dose received by people that may be inadvertently be exposed to UVC light.

FIG. 1 depicts a block diagram 100 illustrating a dosimeter 102 (e.g., a personal UVC dosimeter) having sunlight rejection capability in accordance with embodiments of the present disclosure. The dosimeter 102 includes UVC light sensor interface circuitry 104 (that includes a photodetector 106) electrically coupled with a microcontroller 108. The microcontroller may be a low-power microcontroller. The photodetector 106 may be a UVC sensor diode. The UVC light sensor interface circuitry 104 using the photodetector 106 is configured to provide to suitable dose measurement signals to the microcontroller 108.

The dosimeter 102 also includes visible light sensor interface circuitry 110 (that includes a photodetector 112) electrically coupled with the microcontroller 108. The photodetector 112 may be a visible light sensor diode or phototransistor. The visible light sensor interface circuitry 110 using the photodetector 112 is configured to provide to suitable visible light measurement signals to the microcontroller 108.

The dosimeter 102 also includes wireless transceiver circuitry 114 electrically coupled with an antenna 116 and electrically coupled with the microcontroller 108. The wireless transceiver circuitry 114 may include one or more WPAN radios, one or more WLAN radios, one or more cellular radios, one or more Zigbee® radios, one or more Zwave®, radios, one or more LoRaWAN® radios, and/or the like. The WPAN radios may include Bluetooth® Low Energy (BLE) radios. The WLAN radios may include Wi-Fi radios such as 802.11a, 802.11b/g/n, and/or 802.11ac circuitries. The cellular radios may include may include 2G, 3G, 4G, and/or 5G radios.

In a BLE implementation, the wireless transceiver circuitry 114 and the antenna 116 would use the BLE communication protocol to communicate with a building wireless infrastructure to collect and record dose data for the dosimeter 102. For example, the dosimeter 102 may operate using a BLE beacon signal. Basically, the BLE beacon would transmit dose information every two seconds without activating a BLE receiver on the dosimeter 102.

The dosimeter 102 also includes a visual indicator 118, an audible indicator 120, and a user interface 122 all electrically coupled with the microcontroller 108. The microcontroller is configured to provide UVC dose measurements and alerts to the wireless transceiver circuitry 114, the visual indicator 118, and/or the audible indicator 120. In some embodiments, the visual indicator 118 and/or audible indicator 120 may be omitted from the dosimeter 102.

The visual indicator 118 may include at least one light emitting diode (LED), a liquid crystal display (LCD), and/or the like. The audible indicator 120 may include a speaker, a piezo buzzer, or the like. The user interface 122 may include a capacitive switch or a mechanical switch. Additionally, the user interface 122 and the visual indicator 118 may be provided by a touch pad.

The dosimeter 102 also includes a battery 124 and battery disconnect circuitry 126. The battery disconnect circuitry 126 is configured to couple and decouple the battery 124 from the UVC light sensor interface circuitry 104, the microcontroller 108, the visible light sensor interface circuitry 110, the wireless transceiver circuitry 114, the visual indicator 118, the audible indicator 120, and the user interface 122. The battery 124 is configured to provide direct current (DC) power as needed to the components of the dosimeter 102. The battery 124 may be single-cell Lithium-ion coin cell battery.

In other implementations, the battery 124 may be an AA form factor battery, an AAA form factor battery, a ½ AA form factor battery, a ½ AAA form factor battery, a CR2032 coin cell, or the like. Additionally, a DC to DC converter (not shown in FIG. 1) may be used to generate any additional voltages needed.

Battery life is an important specification when the dosimeter 102 is worn daily. In addition to using low power wireless implementations such as the BLE beacon signal, the battery disconnect circuitry 126 may be used to disconnect all battery drain when the dosimeter 102 is not in use. In some implementations, the battery disconnect circuitry 126 may be integrated with the user interface 122.

Additionally, battery disconnect circuitry 126 may selectively enable components of the dosimeter 102 as needed. For example the UVC light sensor interface circuitry 104, and the visible light sensor interface circuitry 110 may only be enabled when needed for dosage measurements. The wireless transceiver circuitry 114 may also only be enabled when a dosage measure needs to be transmitted.

The microcontroller 108 may be configured to disable adding dose measurements from the UVC light sensor interface circuitry 104 to the accumulated total when an optical power level detected by the visible light sensor interface circuitry 110 is above a predetermined threshold. Basically, if the visible light power is determined to be much higher than normally found indoors (potentially creating an invalid UVC measurement), then microcontroller 108 will not add the dose measurement to the accumulated total. Since, intentional (e.g., disinfecting) UVC light sources are not normally located outdoors, discarding outdoor dose measurements will not impair the accuracy or utility of the dosimeter 102. For example, the microcontroller 108 may completely disable UVC dose calculation and UVC light power measurement when ambient light is above a threshold of 5000 Lux.

The visible light sensor interface circuitry 110 may also only be enabled briefly during dosage measurements to further reduce power consumption. For example, the enablement duty factor of the visible light sensor interface circuitry 110 may be less than 0.01% in a typical application.

Additionally, the microcontroller 108 may be configured to apply a correction factor to the dose measurement and/or the accumulated total based on optical power measured by the visible light sensor interface circuitry 110. Basically the correction factor corrects for out-of-band error incurred by the UVC light sensor interface circuitry 104.

During manufacturing calibration, a precisely known dose or optical power of UVC ultraviolet light energy is delivered by a calibration fixture, such that that the dosimeter 102 can self-calibrate for correct UVC measurement sensitivity. This known visible light intensity may be in the range of 5000 Lux, and permit establishment of reasonably precise ambient light threshold(s).

While the visible light energy is being applied, the dosimeter 102 will also measure the amount of out-of-band signal that is detected by the UVC light sensor interface circuitry 104. This undesired signal is then used by the microcontroller 108 to calculate a correction factors based on ambient light levels detected by the visible light sensor interface circuitry 110. While operating in intended applications, the dosimeter will continuously (or periodically) measure the ambient light and correct the measured UVC dose or power measurement based on ambient light. These correction factors provide significantly improved UVC measurement accuracy at lower UVC power levels.

In some implementations, applying the correction factors for ambient light correction may have some induced error due to various wavelength compositions of ambient light (e.g., sunlight vs indoor lights). However, even in these implementations, the correction factors may provide at least a factor of five error reduction in practice. This error reduction is essential to be able to make sufficiently accurate measurement of low UVC power levels for a personal dosimeter. UVC power levels down to 0.2 uW/cm$^2$ must be measured for reasonably accurate detection of 6 mJ/cm$^2$ per day maximum allowed human dose. In practice, the correction factors may be biased such that measured UVC is slightly low to prevent "false positives" alarms of human over-dose.

Figure 2:
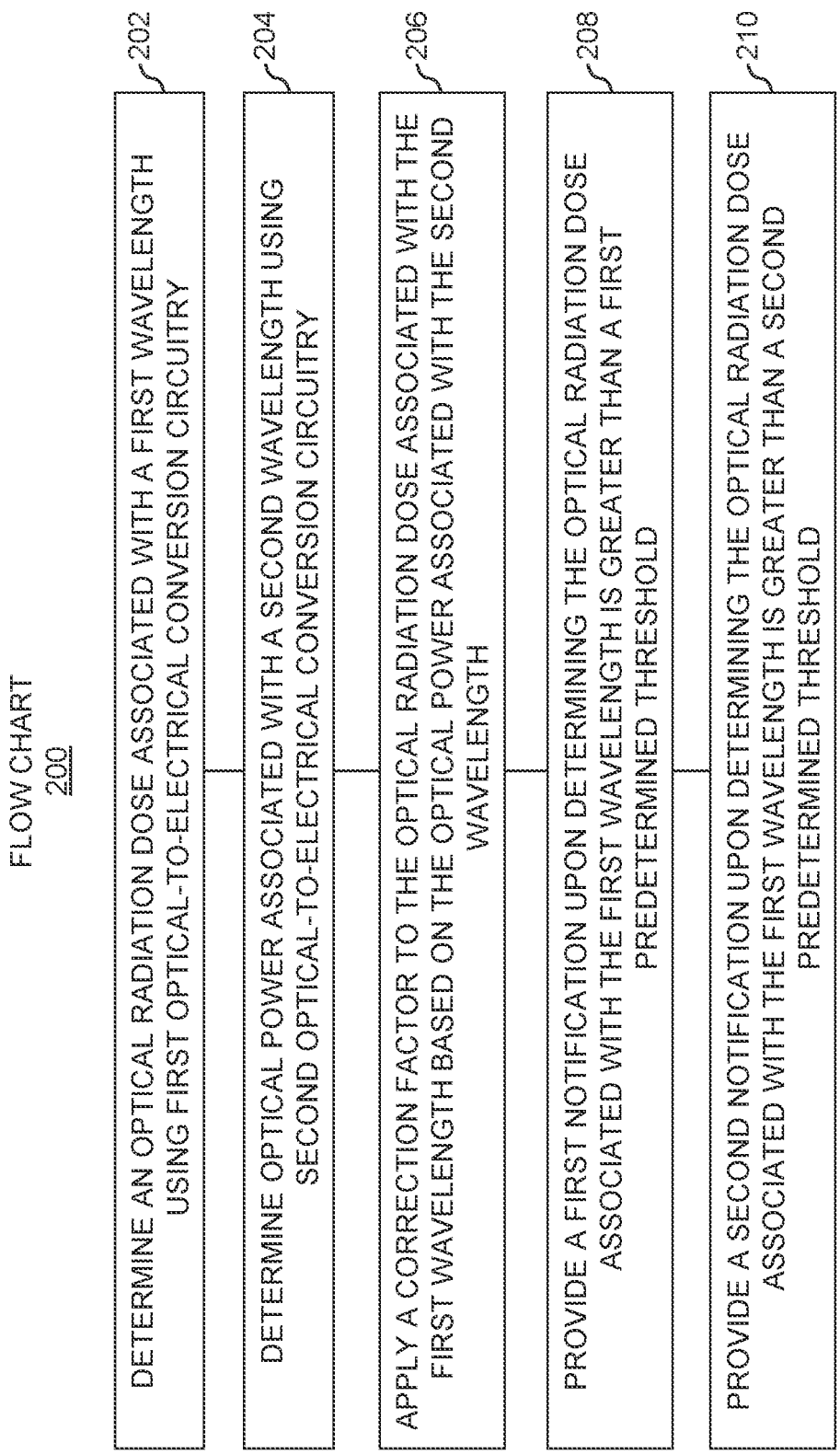
FIG. 2 depicts a flowchart illustrating a method implemented by a microcontroller within the dosimeter of FIG. 1 in accordance with embodiments of the present disclosure.

FIG. 2 depicts a flowchart 200 illustrating a method implemented by the microcontroller 108 within the dosimeter 102 of FIG. 1 in accordance with embodiments of the present disclosure.

In step 202, the method includes determining an optical radiation dose associated with a first wavelength using first optical-to-electrical conversion circuitry 104.

In step 204, the method further includes determining optical power associated with a second wavelength using the second optical-to-electrical conversion circuitry 110.

In step 206, the method further includes applying a correction factor to the optical radiation dose associated with the first wavelength. The correction factor is determined based on the optical power associated with the second wavelength. The correction factor may be determined based on a first approximate linear relationship between first measured radiation and a calibration radiation power level, and a second approximate linear relationship between second measured radiation and the calibration radiation power level. For example, the responsivity of the photodiode 106 and the photodiode 112 in most implementations is substantially linear. The correction factor may also be determined by a lookup table populated during a calibration procedure.

In step 208, the method further includes providing a first notification upon determining the optical radiation dose associated with the first wavelength is greater than a first predetermined threshold. The first predetermined threshold may be associated with a first human exposure limit (e.g., an early warning alert). The first notification may be provided to the wireless transceiver circuitry 114, the visual indicator 118, and/or the audible indicator 120.

In step 210, the method further includes providing a second notification upon determining upon the optical radiation dose associated with the first wavelength is greater than a second predetermined threshold. The second predetermined threshold may be associated with a second human exposure limit (e.g., an imminent danger alert). The second notification may be provided to the wireless transceiver circuitry 114, the visual indicator 118, and/or the audible indicator 120.

Not shown in FIG. 2, the method may further include providing a third notification including a value associated the currently corrected optical radiation dose associated with the first wavelength. The third notification may be provided to the wireless transceiver circuitry 114, the visual indicator 118, and/or the audible indicator 120. The third notification may be provided in millijoules per square centimeter (mJ/cm$^2$) or the like.

Not shown in FIG. 2, the method may further include resetting the determined optical radiation dose upon receiving a reset signal from the wireless transceiver circuitry 114 and/or the user interface 122.

Figure 3:
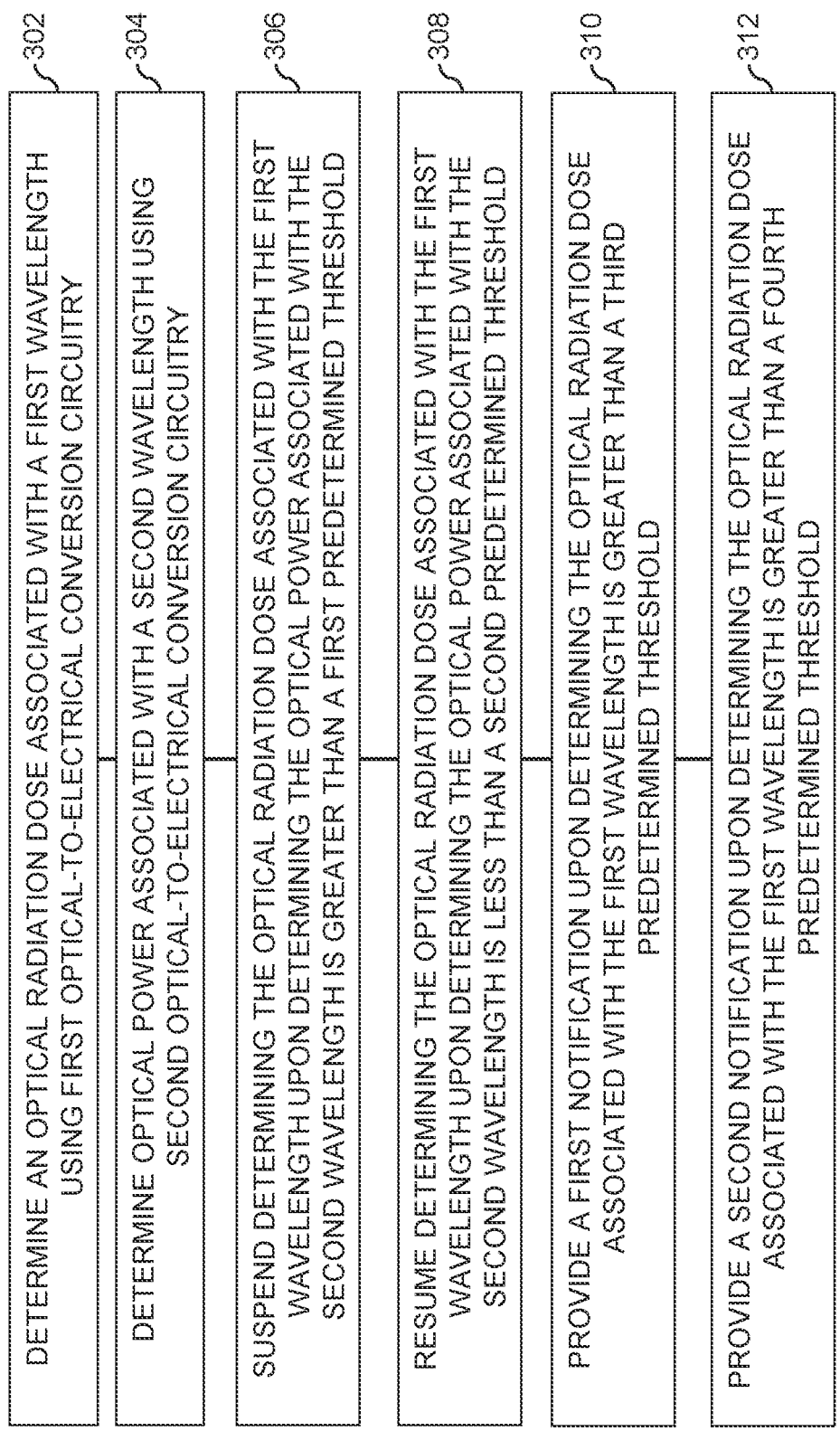
FIG. 3 depicts another flowchart illustrating a method implemented by the microcontroller within the dosimeter of FIG. 1 in accordance with embodiments of the present disclosure.

FIG. 3 depicts a flowchart 300 illustrating another method implemented by the microcontroller 108 within the dosimeter 102 of FIG. 1 in accordance with embodiments of the present disclosure.

In step 302, the method includes determining an optical radiation dose associated with a first wavelength using first optical-to-electrical conversion circuitry 104.

In step 304, the method further includes determining optical power associated with a second wavelength using the second optical-to-electrical conversion circuitry 110.

In step 306, the method further includes suspending determining the optical radiation dose associated with the first wavelength upon determining the optical power associated with the second wavelength is greater than a first predetermined threshold.

In step 308, the method further includes resuming determining the optical radiation dose associated with the first wavelength upon determining the optical power associated with the second wavelength is less than a second predetermined threshold.

In step 310, the method further includes providing a first notification upon determining the optical radiation dose associated with the first wavelength is greater than a third predetermined threshold. The third predetermined threshold may be associated with a first human exposure limit (e.g., an early warning alert). The first notification may be provided to the wireless transceiver circuitry 114, the visual indicator 118, and/or the audible indicator 120.

In step 312, the method further includes providing a second notification upon determining upon the optical radiation dose associated with the first wavelength is greater than a fourth predetermined threshold. The fourth predetermined threshold may be associated with a second human exposure limit (e.g., an imminent danger alert). The second notification may be provided to the wireless transceiver circuitry 114, the visual indicator 118, and/or the audible indicator 120.

Not shown in FIG. 3, the method may further include providing a third notification including a value associated the currently corrected optical radiation dose associated with the first wavelength. The third notification may be provided to the wireless transceiver circuitry 114, the visual indicator 118, and/or the audible indicator 120. The third notification may be provided in $mJ/cm^2$ or the like.

Not shown in FIG. 3, the method may further include resetting the determined optical radiation dose upon receiving a reset signal from the wireless transceiver circuitry 114 and/or the user interface 122.

Figure 4:
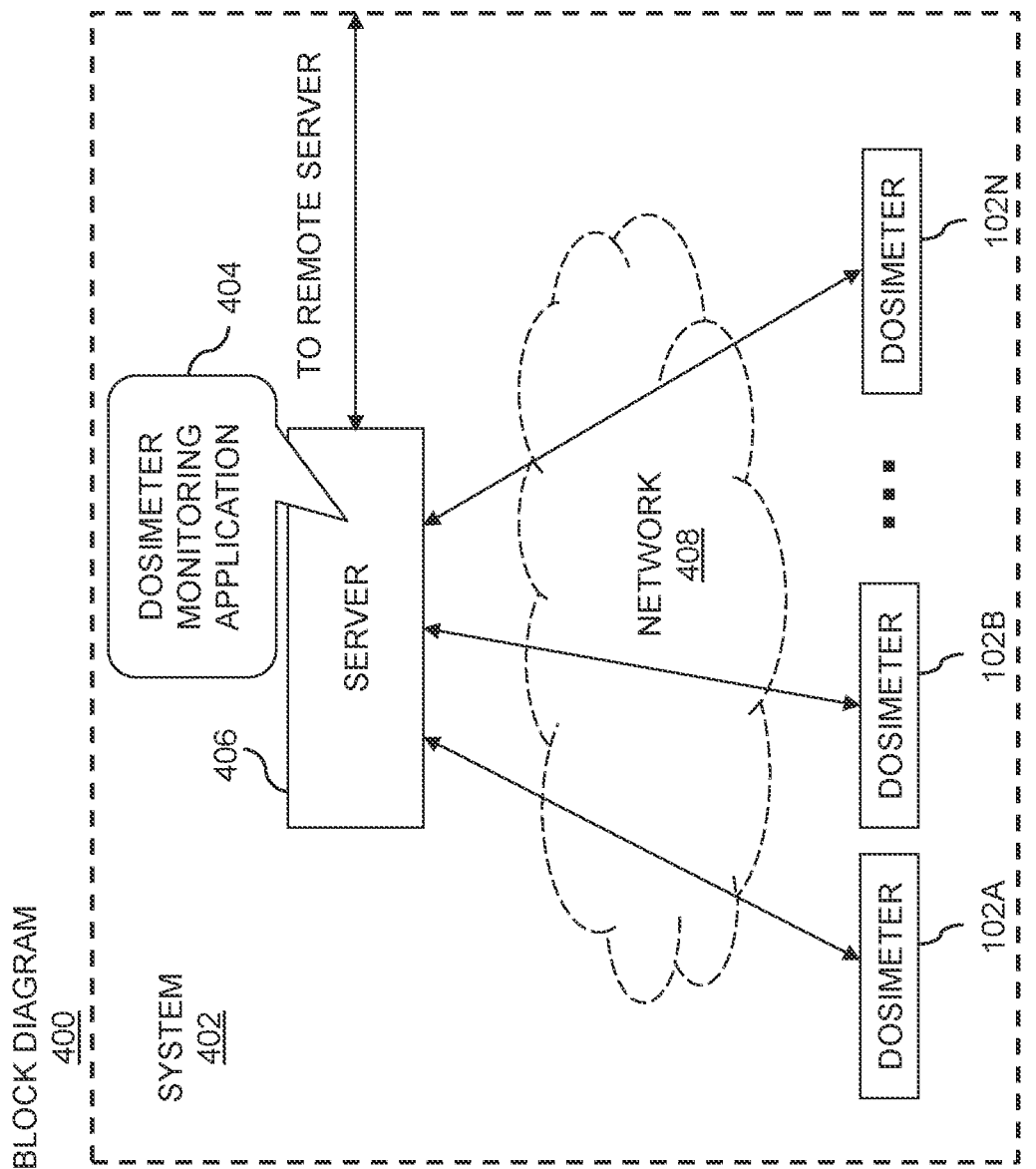
FIG. 4 depicts a block diagram illustrating a system monitoring a plurality of the dosimeters of FIG. 1 in accordance with embodiments of the present disclosure.

FIG. 4 depicts a block diagram 400 illustrating a system 402 monitoring a plurality of the dosimeters 102A through 102N in accordance with embodiments of the present disclosure. The system 402 includes a dosimeter monitoring application 404 executing on a server 406. The dosimeter monitoring application 404 may be configured to receive the first, second, and/or third notifications disclosed in the method of FIG. 2 and/or FIG. 3 over a network 408.

The network 408 may include one or more WPANs, one or more WLANs, one or more cellular network, one or more Zigbee® networks, on or more Zwave®, networks, one or more LoRaWAN® networks, and/or the like. The WPANs may include one or more Bluetooth® Low Energy (BLE) networks. The WLANs may include Wi-Fi technologies such as 802.11a, 802.11b/g/n, and/or 802.11ac technologies. The cellular networks may include may include 2G, 3G, 4G, and/or 5G technologies. The network 408 may also include the Internet.

The dosimeter 102 may also use one or more transfer protocols to communicate with the server 406. The transfer protocols may include a hypertext transfer protocol (HTTP) session, an HTTP secure (HTTPS) session, a secure sockets layer (SSL) protocol session, a transport layer security (TLS) protocol session, a datagram transport layer security (DTLS) protocol session, a file transfer protocol (FTP) session, a user datagram protocol (UDP), a transport control protocol (TCP), a remote direct memory access (RDMA) transfer protocol, or the like.

The server 406 may be implemented within a cloud computing environment such as the Microsoft Azure®, the Amazon Web Services® (AWS), or the like cloud computing data center environments. The server 406 may be implemented as a virtual server such as an Ubuntu® server. The server 406 may also be configured to be hosted within a virtual container. For example, the virtual container may be the Docker® virtual container or the like. In some implementations, the virtual server and/or virtual container may be distributed over a plurality of hardware servers using hypervisor technology.

The server 406 may also be a computing device implemented within a building infrastructure where employees would wear the dosimeter 102 (e.g., hospital, healthcare facility, nursing facility, etc.). For example, the server 406 may be personal computer (PC), a workstation, and/or the like. The server 406 may also be configured to communicate with one or more additional remote servers.

In some implementations, the dosimeter 102 and/or server 406 may communicate directly with a mobile device (not shown in FIG. 4) to provide dosage information. The mobile device may be a smart phone, a smart tablet, a smart watch, and/or the like. The mobile device may also be an iOS® based device, an Android® based device, and/or the like. The mobile device may be executing a dosimeter specific client application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. For example, programming languages may include, but are not limited to: Ruby, JavaScript, Java, Python, Ruby, PHP, C, C++, C#, Objective-C, Go, Scala, Swift, Kotlin, OCaml, or the like.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device comprising: a processor; a memory electrically coupled with the processor; first optical-to-electrical conversion circuitry electrically coupled with the processor and configured to detect radiation associated with a first wavelength; and second optical-to-electrical conversion circuitry electrically coupled with the processor and configured to detect radiation associated with a second wavelength; wherein the processor is configured for: determining an optical radiation dose associated with the first wavelength; determining optical power associated with the second wavelength; and applying a correction factor to the optical radiation dose associated with the first wavelength, wherein the correction factor is determined based on the optical power associated with the second wavelength.

2. The device of claim 1, wherein: the correction factor is further based on first measured radiation detected by the first optical-to-electrical conversion circuitry and second measured radiation detected by the second optical-to-electrical conversion circuitry during a calibration procedure; and the first measured radiation and the second measured radiation are received from a calibration source providing a calibration radiation power level at the second wavelength during the calibration procedure.

3. The device of claim 2, wherein the processor is further configured for determining the correction factor based on:
a first approximate linear relationship between first measured radiation and the calibration radiation power level; and
a second approximate linear relationship between second measured radiation and the calibration radiation power level.

4. The device of claim 2, wherein the processor is further configured for determining the correction factor based on a lookup table.

5. The device of claim 2, wherein the calibration source is configured to provide visible light.

6. The device of claim 2, wherein the processor is further configured for providing a first notification upon determining the optical radiation dose associated with the first wavelength is greater than a first predetermined threshold.

7. The device of claim 6, wherein the first predetermined threshold is associated with a first human exposure limit associated with the first wavelength and the first human exposure limit is associated with a first human exposure time.

8. The device of claim 7, wherein:
the processor is further configured for providing a second notification upon determining the optical radiation dose associated with the first wavelength is greater than a second predetermined threshold; and
the second predetermined threshold is associated with a second human exposure limit and the second human exposure limit is associated with a second human exposure time.

9. The device of claim 8, wherein:
the first notification is associated with an early warning alert; and
the second notification is associated with an imminent danger alert.

10. The device of claim 6, wherein the first notification is at least one of a visual notification and an audible notification.

11. The device of claim 10, wherein the visual notification includes at least one of a light emitting diode (LED) and a liquid crystal display (LCD).

12. The device of claim 6, wherein the first notification is a wireless notification.

13. The device of claim 12, wherein the wireless notification is provided over at least one of a wireless personal area network (WPAN), wireless local area network (WLAN), a cellular network, a Zigbee® network, a Zwave® network, and a LoRaWAN® network.

14. The device of claim 6, wherein the first notification includes a value associated with the optical radiation dose of the first wavelength.

15. The device of claim 1, wherein the first wavelength is between 200 nanometers and 280 nanometers and the second wavelength is between 400 nanometers and 750 nanometers.

16. The device of claim 1, wherein: the correction factor is indicative of out-of-band radiation received by the first optical-to-electrical conversion circuitry; and the out-of-band radiation is associated with exposure to visible light of the first optical-to-electrical conversion circuitry.

17. The device of claim 1, wherein the processor is configured for suspending determining optical radiation dose associated with the first wavelength upon determining the optical power associated with the second wavelength is greater than a first predetermined threshold.

18. The device of claim 17, wherein the processor is further configured for resuming determining optical radiation dose associated with the first wavelength upon determining the optical power associated with the second wavelength is less than a second predetermined threshold.

19. The device of claim 18, wherein the second predetermined threshold is less than the first predetermined threshold.

20. The device of claim 18, wherein the second predetermined threshold is substantiality equal to the first predetermined threshold.

21. The device of claim 1, wherein the device is a wearable personal dosimeter.

22. A processor implemented method comprising:
determining an optical radiation dose associated with a first wavelength;
determining optical power associated with a second wavelength;
applying a correction factor to the optical radiation dose associated with the first wavelength; and
providing a first notification upon determining the optical radiation dose associated with the first wavelength is greater than a first predetermined threshold, wherein:
the correction factor is determined based on the optical power associated with the second wavelength;
first optical-to-electrical conversion circuitry is used in determining the optical radiation dose associated with the first wavelength; and
and second optical-to-electrical conversion circuitry is used in determining the optical power associated with the second wavelength.

23. A non-transitory computer-readable storage medium, the non-transitory computer-readable storage medium storing instructions to be implemented by a processor, the instructions when executed by the processor provide a method for:
determining an optical radiation dose associated with a first wavelength;
determining optical power associated with a second wavelength;
applying a correction factor to the optical radiation dose associated with the first wavelength; and
providing a first notification upon determining the optical radiation dose associated with the first wavelength is greater than a first predetermined threshold, wherein:
the correction factor is determined based on the optical power associated with the second wavelength;
first optical-to-electrical conversion circuitry is used in determining the optical radiation dose associated with the first wavelength; and
and second optical-to-electrical conversion circuitry is used in determining the optical power associated with the second wavelength.

* * * * *